United States Patent Office 3,136,797
Patented June 9, 1964

---

3,136,797
ACYL ISONITRILE CHROMIUM PENTA-CARBONYLS
Raymond E. Maginn, Detroit, Mich., assignor to Ethyl Corporation, New York, N.Y., a corporation of Virginia
No Drawing. Filed Mar. 29, 1962, Ser. No. 183,395
11 Claims. (Cl. 260—438)

This invention relates to novel organometallic compounds and to a process for their preparation. More specifically, the invention relates to isonitrile compounds of chromium, in which the chromium atom is also bonded to five carbonyl radicals.

An object of this invention is to provide novel organometallic compounds of chromium. Another object is to provide novel compounds in which an isonitrile radical is bonded to chromium. Still another object is to provide organometallic derivatives of previously unknown isonitriles. Another object of this invention is to provide a process for the formation of the novel compounds of this invention. Additional objects will become apparent from the following discussion and claims.

The objects of this invention are accomplished by providing new chemical compounds having the formula

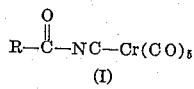

(I)

wherein R is a hydrocarbon radical having one to about 16 carbon atoms selected from the class consisting of alkyl, alkenyl, cycloalkyl, aryl, alkaryl, aralkyl and aralkenyl radicals.

The novel compounds of this invention contain a ketonic carbon atom bonded to an isonitrilic nitrogen atom. Not only are the novel compounds of this invention a new type of organochromium compound, but they are also derivatives of a previously unkown class of organic isonitriles.

The radical R of the novel compounds of this invention can be selected from a wide variety of organic radicals. Typically, these radicals are hydrocarbon radicals; that is, they are composed solely of carbon and hydrogen. Acyl halide starting materials containing these hydrocarbon radicals are preferred because they are generally cheaper than the substituted derivatives.

Compounds which contain other groups attached to the carbon chain of the radical R can be prepared. Hence, compounds such as chloropropionyl isonitrile chromium pentacarbonyl, p-aminobenzoyl isonitrile chromium pentacarbonyl, m-nitrobenzoyl isonitrile chromium pentacarbonyl and 5-hydroxypentoyl isonitrile chromium pentacarbonyl are included within the novel compounds of this invention.

The radical R in the above formula may be an alkyl radical having either a straight or branched chain. Non-limiting examples of this type of radical are the methyl, ethyl, ispropyl, amyl and 3-hexyldecyl radicals. Similarly, R may be an alkenyl radical such as the tehenyl, isopropenyl and 4-hexenyl radicals. R may contain two or more olefinic bonds. Radicals containing two olefinic bonds are the 1,3-pentadienyl radical and the like. R may contain one or more triple bonds.

R may be an alicyclic radical. Thus, for example, R may be a cyclohexyl or cyclopentyl radical. The alicyclic radical may contain olefinic bonds. Illustrative radicals of this type are the cyclopentenyl and 1,3-cyclohexadienyl radicals.

Furthermore, the cyclic radicals described and illustrated above may be substituted by aliphatic or aromatic substituents. Aralkyl radicals such as the phenylcyclohexenyl radicals and phenylcyclohexyl radicals are non-limiting examples of this type. Non-limiting examples of alkyl substituted alicyclic radicals are the ethylcyclohexyl, dimethylcyclohexyl and 1-methyl-3-cyclohexyl radicals.

Aralkyl radicals such as the β-phenylethyl and β-phenylbutyl radicals are also applicable.

R may also be a univalent aromatic radical. Non-limiting examples of applicable aromatic radicals are the phenyl, biphenyl, naphthyl, 2,3-xylyl, and p-cumenyl radicals.

From the above discussion it is apparent that the exact structural configuration of the radical R is not critical. No limitation as to size or complexity of the radical has been found. However, the preferred radicals have one to about 16 carbon atoms, since the novel compounds comprising them are more easily prepared, and the starting materials from which they are derived are more economical and readily available.

The novel compounds of this invention are prepared by a process which comprises reacting an acyl halide having two to about 16 carbon atoms selected from the class consisting of alkoyl, alkenoyl, cycloalkoyl, aroyl, alkaroyl, aralkoyl, aralkenoyl halides and alkali metal-etherate cyano chromium pentacarbonyl salt having the formula:

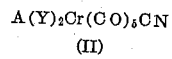

(II)

in which A is an alkali metal cation and Y is a bidentate non-cyclic ether.

The acyl halides employed in this process donate the

moiety in the novel compounds. The applicable acyl halides are those that correspond to the radicals described above. The acyl halides may be selected from the class consisting of acyl chlorides, acyl bromides and acyl iodides. The preferred halides are the chlorides and bromides. Generally, the chlorides are less expensive and are sufficiently reactive; hence, they are preferred.

The cyano chromium pentacarbonyl salts employed in this process contribute the $NC-Cr(CO)_5$ moiety in the new compounds. The salts are described in my co-pending application, Serial No. 102,123, filed April 11, 1961, now U.S. Patent No. 3,095,436. These salts are composed of a cyano chromium pentacarbonyl anion, $$Cr(CO)_5CN^-$$

and an etherated-alkali metal cation. The alkali metal cation may be either lithium, sodium, potassium, cesium or rubidium. Preferably, it is sodium or potassium, most preferably sodium. The either molecule coordinated with the alkali metal is a bidentate ether such as dimethoxyethane, diethoxypropane, dipropoxyethane and the like. Illustrative examples of these starting materials are sodium bis(1,2-dimethoxyethane) cyano chromium pentacarbonyl, $Na(DME)_2Cr(CO)_5CN$; sodium bis(1,3-diethoxypropane) cyano chromium pentacarbonyl,

and sodium bis(1,2-dipropoxyethane) cyano chromium pentacarbonyl, $Na(DPE)_2Cr(CO)_5CN$.

The process of this invention can be depicted as follows:

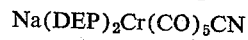

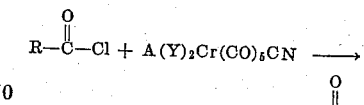

Usually a solvent is employed in this novel process. Relatively non-polar solvents that do not contain an active hydrogen are the solvents of choice. Typical solvents that can be employed in this process are ethers and acetals. It is preferred that the solvents be deoxygenated prior to use. Solvents that are non-reactive toward the products and reactants, and which readily dissolve these compounds are preferred.

The most preferred solvents are the non-cyclic ethers such as dibutylether, diethylether, diethyleneglycol dimethylether, dipropyleneglycol diethylether and the like. Other ether solvents that can be employed are the bidentate non-cyclic ethers such as dimethoxyethane, diethoxyethane, dipropoxyethane and the like.

A still further class of solvents which can be employed are cyclic and acyclic aliphatic hydrocarbon ketones, such as cyclopentanone and diethylketone, which preferably have a normal boiling point ranging from about 60° to about 200° C.

The process of this invention is effectively carried out at atmospheric pressure. However, higher and lower pressures can be employed. The reaction is preferably carried out in the presence of an inert atmosphere. For this purpose the reaction mixture is blanketed with a gas such as nitrogen, helium, argon, neon and the like. Nitrogen gas is preferred since it is more economical.

The reaction temperature is not critical and the process may be carried out at a temperature in the range of $-20°$ to $100°$ C. Higher or lower temperatures may be employed if desired. However, it is preferred that the temperature is high enough to afford a reasonable rate of reaction but not so high as to destroy the products or reactants. The preferred temperature is in the range of $15°$ to $35°$ C.

Although not necessary, it is preferred that the reaction mixture be agitated. Agitation affords a more even reaction rate and a somewhat shorter reaction time.

The time required is not a true independent variable but is dependent upon the other process variables employed. Generally, when high temperatures and agitation are employed, there will be a proportionate decrease in the reaction time. When the process of this invention is followed as illustrated by the above discussion and the following examples, reaction times in the order of one to 48 hours usually yield satisfactory results. The preferred reaction time is in the range of 12 to 48 hours. However, if it is desired, higher yields of products can be obtained if the reaction time is extended to from about 5 to about 10 days.

In general, the products of this invention are yellow to orange crystalline solids. They can be readily separated from the reaction mixture by techniques familiar to those skilled in the art such as crystallization, sublimation and chromatography.

To further illustrate the process of this invention and the products produced thereby, there are presented the following examples in which all parts and percentages are by weight unless otherwise noted.

Example I

A mixture of 12.6 parts of sodium bis(dimethoxyethane) cyano chromium pentacarbonyl,

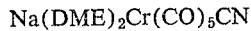

$Na(DME)_2Cr(CO)_5CN$ 4.2 parts of benzoyl chloride and 125 parts of diethylether was stirred for two days at room temperature. The precipitate of sodium chloride was removed by filtration and the solvent was removed from the filtrate by vacuum distillation in a rotary evaporator. The orange residue was extracted six times with 80 part portions of petroleum ether. Cooling of the combined extracts followed by filtration yielded 3.5 parts of orange solids (37 percent). Increasing the reaction time to five days raised the yield to 57 percent.

The crude solids were recrystallized from petroleum ether. Orange crystals of benzoyl isonitrile chromium pentacarbonyl, M.P. 85–86° C. were obtained. The compound is soluble in carbon disulfide but insoluble in water. The infrared spectrum had major peaks at 4.75, 5.2, and 6.0 microns. Magnetic measurements indicated the compound to be diamagnetic. *Analysis.*—Calculated for $C_{13}H_5O_6NCr$: C, 48.3; H, 1.55; N, 4.33; Cr, 16.1; molecular weight 323. Found: C, 48.0; H, 1.45; N, 4.45; Cr, 16.2; molecular weight 349.

Example II

A mixture of 12.6 parts of sodium bis(dimethoxyethane) cyano chromium pentacarbonyl, 3.2 parts of isobutyryl chloride and 125 parts of diethylether was stirred at room temperature overnight. The orange-red solution was decanted from the precipitate of sodium chloride. The solvent was removed from the filtrate under reduced pressure in a rotary evaporator. The dark oily residue was extracted several times with petroleum ether (about 80 part portions). The extracts were combined and concentrated under reduced pressure using a rotary evaporator. After cooling and filtration, 3.1 parts (36 percent) of crude yellow solids were obtained. Another run made in the same manner except that the reaction time was increased to six days, increased the yield to 46 percent. The crude product was recrystallized from petroleum ether, and pale yellow crystals of isobutyryl isonitrile chromium pentacarbonyl, M.P. 55–57.5° C. were obtained. The compound is soluble in benzene and carbon tetrachloride, insoluble in water and can be slowly sublimed, unchanged, at room temperature. The infrared spectrum showed major peaks at 4.75, 5.2 and 5.9 microns. *Analysis.*—Calculated for $C_{10}H_7O_6NCr$: C, 41.5; H, 2.45; N, 4.84; Cr, 18.0. Found: C, 4.19; H, 2.73; N, 4.8; Cr, 18.3.

Example III

The procedure of Example I is followed substituting 2-cyclohexylacetyl chloride for benzoyl chloride. The product 2-cyclohexylacetyl isonitrile chromium pentacarbonyl is obtained.

Similarly, the compound (2-cyclohexenylacetyl) isonitrile chromium pentacarbonyl is prepared when 2-cyclohexenylacetyl bromide is used in the process. These products are also prepared when potassium bis(1,3-dipropoxyethane) cyano chromium pentacarbonyl is used in the process.

Example IV

Following the procedure in Example I with substitution of o-toluoyl bromide for benzoyl chloride, the product o-toluoyl isonitrile chromium pentacarbonyl is obtained. Similarly, 1,3,5-triethylbenzoyl isonitrile chromium pentacarbonyl is obtained when the corresponding acyl bromide, 1,3,5-triethylbenzoyl bromide is employed in the process.

Similarly, biphenyloyl isonitrile chromium pentacarbonyl is prepared when biphenyloylbromide is used in the process. These products are also obtained when potassium bis(1,2-dipropoxyethane) cyano chromium pentacarbonyl is used in the process.

Example V

Following the procedure of Example I, the compound 2,2,4-tripropylpentoyl isonitrile chromium pentacarbonyl is obtained when the corresponding acyl chloride, 2,2,4-tripropylpentoylchloride is employed.

Example VI

Following the procedure of Example I, the compound 1-methyl cinnamoyl isonitrile chromium pentacarbonyl is obtained when the corresponding acyl halide, 1-methylcinnamoyl chloride is employed.

The novel compounds of this invention have many utilities. One of the uses of these compounds is in metal plating. In this application, a vapor of the compound is decomposed to deposit a metal containing film on a substrate material. The substrate material is heated above the decomposition temperature of the compound in a closed chamber containing the vapor of one of the compounds of this invention. A variation of this utility is dipping the substrate material into a vessel containing the compound and then heating the substrate above the decomposition temperature of the compound. The metal-containing films which are formed from the compounds can be employed as conductive surfaces such as those employed in a blended circuit or they can be used to produce a decorative effect on the substrate material.

The novel compounds of this invention are also useful chemical intermediates. As an example of this utility, the following example is presented.

*Example VII*

A solution of 1.62 parts of benzoyl isonitrile chromium pentacarbonyl in 60 parts of methanol was refluxed for five hours. Gas evolution corresponding to 1.5 molar equivalents was noted, but the rate of gas evolution slowed down after one equivalent. Solvent was removed from the clear green-yellow solution at reduced pressure leaving a brownish-red oily residue. This was evaporatively distilled overnight, yielding 0.32 part of a clear liquid with a sweet ester-like odor. The infrared spectrum of this liquid was identical to that of pure methyl benzoate.

Having fully defined the novel compounds of this invention, their mode of preparation and their many utilities, it is desired that the invention be limited only within the lawful scope of the appended claims.

I claim:

1. Compounds having the formula

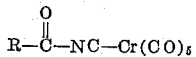

wherein R is a hydrocarbon radical having one to about 16 carbon atoms.

2. Benzoyl isonitrile chromium pentacarbonyl.
3. Isobutyryl isonitrile chromium pentacarbonyl.
4. Process for the formation of an organometallic compound having the formula

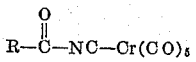

wherein R is a hydrocarbon radical having one to about 16 carbon atoms, said process comprising reacting an acyl halide having two to about 16 carbon atoms with a compound having the formula $$A(Y)_2Cr(CO)_5CN$$

in which A is an alkali metal cation and Y is a bidentate non-cyclic ether.

5. A process for the formation of benzoyl isonitrile chromium pentacarbonyl, said process comprising reacting benzoyl chloride with sodium bis(dimethoxyethane) cyano chromium pentacarbonyl.

6. A process for the preparation of isobutyryl isonitrile chromium pentacarbonyl, said process comprising reacting isobutyryl chloride with sodium bis(dimethoxyethane) cyanochromium pentacarbonyl.

7. The process of claim 6 being carried out in the presence of diethylether.

8. Process for the formation of an organometallic compound having the formula

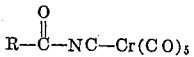

wherein R is a hydrocarbon radical having 1 to about 16 carbon atoms, said process comprising reacting an acyl halide having 2 to about 16 carbon atoms, with a compound having the formula $A(Y)_2Cr(CO)_5CN$, in which A is an alkali metal cation and Y is a bidentate non-cyclic ether selected from the class consisting of dimethoxyethane, 1,2-dipropoxyethane, and 1,3-dipropoxyethane.

9. The process of claim 4 being carried out at a temperature within the range of 20° to 100° C.

10. The process of claim 4 being carried out in the presence of a non-reactive organic solvent.

11. The process of claim 10 wherein the non-reactive organic solvent is diethylether.

References Cited in the file of this patent

Chemische Berichte, volume 89, No. 3, March 1956, (pages 616–619).